Dec. 31, 1940.  A. WAGNER  2,227,237
PHOTOGRAPHIC SHUTTER BRAKE
Filed Oct. 25, 1939
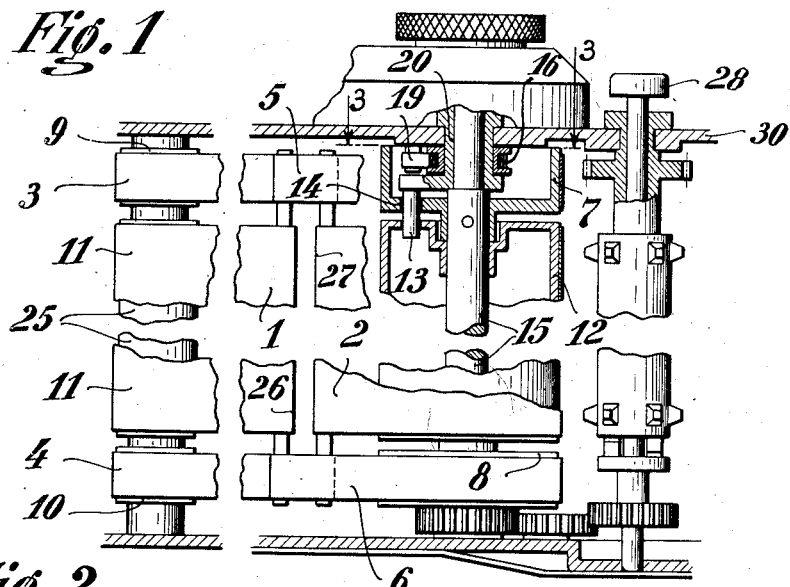
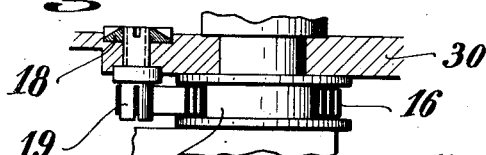
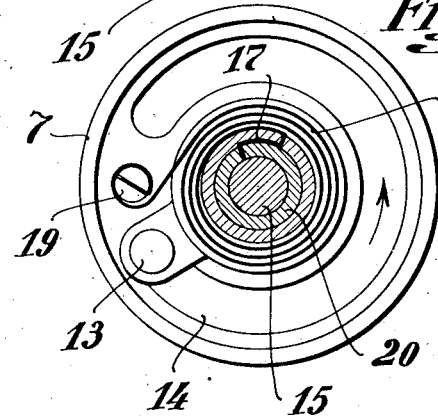
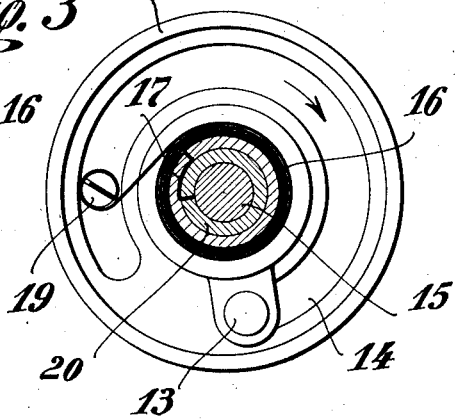
INVENTOR
*Adam Wagner*
BY
*Ivan E. O. Konigsberg*
ATTORNEY Patented Dec. 31, 1940

2,227,237

UNITED STATES PATENT OFFICE 2,227,237

PHOTOGRAPHIC SHUTTER BRAKE

Adam Wagner, Wetzlar-Lahn, Germany, assignor, by mesne assignments, to Frank Dumur, Lausanne, Switzerland Application October 25, 1939, Serial No. 301,127
In Germany November 21, 1938

3 Claims. (Cl. 95—57)

This invention relates to improvements in focal plane shutters and the object of the invention is to provide a braking device for braking the movements of the shutter curtains whereby to eliminate the clicking sound which is heard when the curtains snap together at the end of an exposure.

Braking devices for focal plane shutters are known. Thus for instance it has been proposed to brake or dampen the movements of the shutter curtains after an exposure by means of certain yielding members connected to the shutters and which may be of the type disclosed in U. S. Patent 2,192,500, March 5, 1940, issued to the assignee of this application for improvements in Shutter mechanisms. A device of this type includes the disadvantage that a spring-back movement may occur which may result in the curtain edges being thrown back within the exposure area so that a second exposure may occur which of course spoils the picture.

It has also been proposed to use brakes having definite stop members. These however are apt to develop objectionable noises. Other types of brakes use friction layers with a layer of lubricating substance. These are objectionable because such lubricating layer is subject to the changes in temperatures.

The above pointed out disadvantages are eliminated and avoided in the present invention which is embodied in a band brake. One end of the brake band is wound around a part which rotates when the shutter is opened. The other end of the brake band is secured to the camera. It has been found advantageous to use a metallic brake band and the device includes means for adjusting the braking power. Preferably the band brake is mounted axially on the curtain roller.

Accordingly the invention is embodied in a photographic shutter brake arranged and constructed as hereinafter set forth and as illustrated in the accompanying drawing in which Fig. 1 is a view of so much of a focal plane shutter mechanism as is necessary for an understanding of the invention, parts are in section and parts are broken away.

Fig. 2 is a detail view of the band brake.

Fig. 3 is a sectional detail view on the line 3—3 in Fig. 1 showing the band brake with the windings loose as it appears after the shutter has been rewound.

Fig. 4 is a similar view but shows the brake in braking position at the end of an exposure.

Fig. 1 shows all the essential parts of a well known focal plane shutter mechanism used in a modern miniature hand camera such as the one known as the Leica camera. The shutter consists of two blinds or curtains 1 and 2. The leading curtain 1 has its left hand edge secured to a curtain spring roller 25, while the right hand edge 26 is connected by upper and lower ribbons 5 and 6 to curtain drums 7 and 8. The follow up curtain 2 has its left hand edge 27 connected by upper and lower ribbons 3 and 4 to spring roller drums 9 and 10. The right hand edge thereof is connected to the curtain roller 12 rotatably carried on a curtain roller shaft 15. The two drums 7 and 8 are fast on the shaft 15. The curtain roller shaft 15 with drums 7 and 8 is coupled to the curtain roller 12 by a depending pin 13 which rotates in a circular slot 14 in the drum 7 and which is fast in a nipple 20 which is freely rotatable on the shaft 15.

Normally the follow up curtain 2 is wound up upon the curtain roller 12 and the ribbons 5 and 6 are wound up upon the drums 7 and 8 so that the leading curtain 1 is across the objective field of the camera. When the shutter is released by depressing the shutter release 28 the leading curtain 1 is drawn to the left thereby opening the shutter and the curtain is wound up upon the spring roller 25. The follow up curtain 2 is also drawn to the left and its ribbons 3 and 4 are wound up upon the drums 9 and 10, the curtain unwinding from the roller 12. The arrangement is such that the follow up curtain 2 remains stationary until the exposure slit between the curtains has been formed, that is, the drum 7 rotates with relation to the pin 13 which stands in the slot 14.

All of the foregoing is well known in the art and sufficiently explains the operation of the shutter where an exposure is made. Heretofore however, as disclosed in the above mentioned patent, the pin 13 was held immovable until it was released by a suitable timing mechanism, whereupon the pin was released and in turn rotated the curtain roller so that the follow up curtain could unwind and the shutter be closed. The pin 13 therefore was moved up against the end of the slot 14 at the end of the unwinding movement of the follow up curtain. In the present invention a band brake is provided to limit the movement of the follow up curtain and to eliminate the audible click which resulted when the pin 13 was brought forcibly against the end of the slot 14.

The band brake consists of a band 16, metallic or otherwise, which is coiled several times around the nipple 20 and secured thereto as indicated at 17. The other end of the band is secured to a pin 19, see Fig. 2, which may be rotated by means of a screw head 18 to adjust the tension of the brake in a known manner. The pin is secured to the camera wall 30.

When the shutter is wound up after an exposure the nipple 20 rotates anticlockwise and the coils of the band 16 are loosened as shown in Fig. 3. When the shutter is released the nipple 20 moves clockwise and winds up the band as shown in Fig. 4. Hence the rotation of the curtain roller 12 is controlled and limited by the length of the brake band which is wound up at the same time. The movement of the follow up curtain is therefore limited by the length of the band which is wound up. Therefore, instead of, as in prior constructions, the pin 13 hitting the end of the slot 14, the brake band catches hold of the follow up curtain in a yielding manner damping the inertia thereof without any possibility of a spring back movement. By applying a screw driver to the screwhead 18 more or less of the band may be wound upon the pin 19 and thus the length of the band and its action regulated and controlled.

The brake according to this invention has been disclosed in connection with the operation of the follow up curtain as a matter of illustration and not as a limitation. The brake may be applied to some other part of the shutter but such modification is not shown. The brake is very simple in construction and efficient in operation. It may be built into the existing shutter mechanism without requiring any special rebuilding thereof.

I claim:

1. In a camera, a focal plane shutter including two shutter curtains and a movable element in said shutter mounted to move with one of said curtains when the same are released to open said shutter, a device for braking and damping the opening movement of the said one curtain at the end of said movement, said device consisting of a brake comprising a brake band coiled around said movable element, means for securing the inner end of said coiled brake band to said movable element and means for securing the other end of said brake band to a fixed part of the camera.

2. A braking device according to claim 1 including means for adjusting the effective braking length of said brake band.

3. In a camera, a focal plane shutter including two shutter curtains, a curtain roller upon which one of said curtains is wound up, a shaft supporting said curtain roller, a nipple on said shaft freely rotatable thereon to move with the said one curtain when the curtains are released to open the shutter, a device for braking and damping the opening movement of the said one curtain at the end of said movement, said device consisting of a brake comprising a brake band coiled around said nipple, means for securing the inner end of said coiled brake band to said nipple and means for securing the other end of said brake band to a fixed part of the camera.

ADAM WAGNER.